United States Patent
Speranza et al.

(10) Patent No.: US 7,060,379 B2
(45) Date of Patent: *Jun. 13, 2006

(54) METHOD AND SYSTEM FOR CONTROLLING AND RECOVERING SHORT DURATION BRIDGE POWER TO MAXIMIZE BACKUP POWER

(75) Inventors: A. John Speranza, West Hartford, CT (US); Michael Cardin, Berlin, CT (US); Lawrence Moulthrop, Windsor, CT (US); Mark Lillis, South Windsor, CT (US); John Zagaja, East Granby, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 455 days.

This patent is subject to a terminal disclaimer.

(21) Appl. No.: 10/065,387

(22) Filed: Oct. 11, 2002

(65) Prior Publication Data

US 2003/0072977 A1  Apr. 17, 2003

Related U.S. Application Data

(60) Provisional application No. 60/328,996, filed on Oct. 12, 2001, provisional application No. 60/410,412, filed on Sep. 13, 2002.

(51) Int. Cl.
H01M 10/46 (2006.01)
H01M 8/04 (2006.01)
(52) U.S. Cl. .............................. 429/9; 429/23; 307/65; 320/101; 320/138
(58) Field of Classification Search .................... 429/9, 429/22, 23; 307/64, 65; 320/101, 138; 700/286
See application file for complete search history.

(56) References Cited

U.S. PATENT DOCUMENTS

| 4,100,051 A | 7/1978 | Kilby et al. ................ 204/266 |
| 4,341,607 A | 7/1982 | Tison ........................ 204/129 |
| 5,334,463 A | 8/1994 | Tajima et al. .................. 429/9 |
| 5,810,284 A | 9/1998 | Hibbs et al. .................. 244/13 |
| 5,942,811 A | 8/1999 | Stumfall et al. .............. 307/64 |

(Continued)

FOREIGN PATENT DOCUMENTS

DE  195 38 381  4/1997

(Continued)

OTHER PUBLICATIONS

Computer-generated translation of JP 2001-266,923 (Yamaguchi et al.) Sep. 2001.*

(Continued)

Primary Examiner—Stephen J. Kalafut
(74) Attorney, Agent, or Firm—Cantor Colburn LLP

(57) ABSTRACT

A power system, comprising: a primary power source in electrical communication with a bus and a bridging power source, wherein the bridging power source comprises at least one of a capacitor, a battery, and an electrolysis cell, and the bridging power source is in electrical communication with the bus; and a secondary power source in electrical communication with the bus. A method for operating a power system, comprising: monitoring a primary power source; if the primary power source exhibits selected characteristics, directing power from a bridging power source to a bus and initiating a secondary power source, and the bridging power source comprises at least one of a capacitor, a battery, and an electrolysis cell; and unless the secondary power source exhibits the selected characteristics, powering the bus with the secondary power source and ceasing the directing power from the bridging power source.

14 Claims, 13 Drawing Sheets

U.S. PATENT DOCUMENTS

| | | | |
|---|---|---|---|
| 5,994,793 A | 11/1999 | Bobry | 307/64 |
| 6,011,324 A | 1/2000 | Kohlstruck et al. | 307/64 |
| 6,134,124 A | 10/2000 | Jungreis et al. | 363/34 |
| 6,163,088 A | 12/2000 | Codina et al. | 307/64 |
| 6,184,593 B1 | 2/2001 | Jungreis et al. | 307/64 |
| 6,288,456 B1 | 9/2001 | Cratty | 307/64 |
| 6,459,231 B1 | 10/2002 | Kagatani | 320/101 |
| 6,465,910 B1 | 10/2002 | Young et al. | 307/64 |
| 6,555,989 B1 | 4/2003 | Pearson | 302/101 |
| 6,593,671 B1 * | 7/2003 | Schell | 307/64 X |
| 6,611,068 B1 | 8/2003 | Cratty | 307/64 |
| 6,628,011 B1 | 9/2003 | Droppo et al. | 307/43 |
| 2002/0058175 A1 | 5/2002 | Ruhl | 429/32 |
| 2002/0109410 A1 | 8/2002 | Young et al. | 307/64 |
| 2002/0117899 A1 | 8/2002 | Seefried et al. | 307/64 |
| 2002/0140293 A1 | 10/2002 | Rothleitner et al. | 307/64 |
| 2003/0072977 A1 | 4/2003 | Speranza et al. | |
| 2003/0113595 A1 | 6/2003 | Jungreis | 429/13 |

FOREIGN PATENT DOCUMENTS

| | | |
|---|---|---|
| EP | 0755088 A2 | 1/1997 |
| EP | 0 782 209 A1 | 2/1997 |
| JP | 4-304126 | 10/1992 |
| JP | 410153165 A | 6/1998 |
| JP | 02001266923 A | 9/2001 |
| JP | 02002075388 A | 3/2002 |
| WO | WO01/28017 A2 | 4/2001 |
| WO | WO 01/71885 | 9/2001 |
| WO | WO02/10877 A2 | 2/2002 |
| WO | WO 02/084670 | 10/2002 |

OTHER PUBLICATIONS

Computer-generated translation of JP 2002-75,388 (Takeuchi) Mar. 2002.*

International Search Report, International Application No.: PCT/US02/32615, International Filing Date: Oct. 11, 2002, Date of Mailing: Mar. 11, 2003, 8 pages.

Warner, S.M., "The Operation of Aluminum-Air Reserve Power Systems," IEEE Intelec '91, Nov. 1991.

Key, T., "Fast Response, Load Matching Hybrid Fuel Cell," EPRI PEAC Quarterly Review Meeting, Washington, DC, Jul. 27, 2001.

Warner, S.M., "Extending the Reliability of DC Power in a Telecommunications Network," I INTELEC '93 15th International Telecommunications Energy Conference, Paris, 1993, month unknown.

Maloney, T., "PEM-Battery: Design, Construction, and Test," Power Computing Solutions, Inc., NETL Publications, 1999 Conference Proceedings, month unknown.

Ertl, H. et al., "A Novel Multi-Cell DC-AC Converter for Applications in Renewable Energy Systems," Proceedings of the 43rd International Power Electronics Conference, Jun. 2001.

Passive Component Industry, "Large-Can EDLC Capacitors: A Market in the Making," Jul./Aug. 2001.

Nickerson, J., "Ultracapacitors: Managing Power and Energy," Darnell Group, Inc., 2000, month unknown.

Kato, N., et al., "A lkW Portable Fuel Cell System Based on Polymer Electrolyte Fuel Cells," NTT R and D, vol. 48, No. 12, pp. 877-881, 1991, month unknown.

E.M. Cortright, chairman, "Report of Apollo 13 Review Board," NASA, Appendix A, pp. A-42 to A-51, Jun. 15, 1970.

U.S. Appl. No. 10/065,386, filed Oct. 11, 2002, McCluskey et al.

* cited by examiner

FIG. 11A

| Given | | Resulting values | | | | | Given | Resulting values | |
|---|---|---|---|---|---|---|---|---|---|
| Cap size | Cap voltage | Resulting cap | Resulting charge | Resulting energy | Energy | Energy | Output power | Resulting holdup time | |
| F | V | uF | C | J | Ws | kWs | kW | s | min |
| Farads | Volts | micro-Farads | Coulombs | Joules | Watt-seconds | kWatt-seconds | Kilo-watts | Seconds | Minutes |
| 0.0077 | 25 | 7700 | 0.19 | 60 | 60 | 0 | 10 | 0.01 | 0.0 |
| 0.0077 | 50 | 7700 | 0.39 | 481 | 481 | 0 | 10 | 0.05 | 0.0 |
| 0.0077 | 75 | 7700 | 0.58 | 1624 | 1624 | 2 | 10 | 0.16 | 0.0 |
| 0.0077 | 100 | 7700 | 0.77 | 3850 | 3850 | 4 | 10 | 0.39 | 0.0 |
| 0.0077 | 125 | 7700 | 0.96 | 7520 | 7520 | 8 | 10 | 0.75 | 0.0 |
| 0.0077 | 150 | 7700 | 1.16 | 12574 | 12574 | 10 | 10 | 1.25 | 0.0 |
| 0.0077 | 175 | 7700 | 1.35 | 20634 | 20634 | 21 | 10 | 2.06 | 0.0 |
| 0.0077 | 200 | 7700 | 1.54 | 30800 | 30800 | 31 | 10 | 3.08 | 0.1 |
| 0.0077 | 225 | 7700 | 1.73 | 43854 | 43854 | 44 | 10 | 4.39 | 0.1 |
| 0.0077 | 250 | 7700 | 1.93 | 60156 | 60156 | 60 | 10 | 6.02 | 0.1 |
| 0.0077 | 275 | 7700 | 2.12 | 80068 | 80068 | 80 | 10 | 8.01 | 0.1 |
| 0.0077 | 300 | 7700 | 2.31 | 103960 | 103950 | 104 | 10 | 10.40 | 0.2 |
| 0.0077 | 325 | 7700 | 2.50 | 132163 | 132163 | 132 | 10 | 13.22 | 0.2 |
| 0.0077 | 350 | 7700 | 2.70 | 165069 | 165069 | 165 | 10 | 18.51 | 0.3 |
| 0.0077 | 375 | 7700 | 2.89 | 203027 | 203027 | 203 | 10 | 20.30 | 0.3 |
| 0.0077 | 400 | 7700 | 3.08 | 246400 | 246400 | 246 | 10 | 24.64 | 0.4 |
| 0.0077 | 425 | 7700 | 3.27 | 290540 | 290545 | 296 | 10 | 29.55 | 0.5 |
| 0.0077 | 450 | 7700 | 3.47 | 350631 | 350631 | 351 | 10 | 35.06 | 0.6 |
| 0.0077 | 475 | 7700 | 3.66 | 412612 | 412612 | 413 | 10 | 41.26 | 0.7 |
| 0.0077 | 500 | 7700 | 3.85 | 481250 | 481250 | 481 | 10 | 48.13 | 0.8 |
| 0.0077 | 525 | 7700 | 4.04 | 557107 | 557107 | 557 | 10 | 55.71 | 0.9 |
| 0.0077 | 550 | 7700 | 4.34 | 640644 | 640644 | 611 | 10 | 64.05 | 1.1 |
| 0.0077 | 575 | 7700 | 4.43 | 731921 | 731921 | 732 | 10 | 73.19 | 1.2 |
| 0.0077 | 600 | 7700 | 4.62 | 831600 | 831600 | 832 | 10 | 83.16 | 1.4 |
| 0.0077 | 625 | 7700 | 4.81 | 939941 | 939941 | 940 | 10 | 93.99 | 1.6 |

FIG. 11B

| Given | | Resulting values | | | | | Given | Resulting values | |
|---|---|---|---|---|---|---|---|---|---|
| Cap size | Cap voltage | Resulting cap | Resulting charge | Resulting energy | Energy | Energy | Output power | Resulting holdup time | |
| F | V | uF | C | J | Ws | kWs | kW | s | min |
| Farads | Volts | micro-Farads | Coulombs | Joules | Watt-seconds | kWatt-seconds | Kilo-watts | Seconds | Minutes |
| 0.001 | 25 | 1000 | 0.03 | 8 | 8 | 0 | 10 | 0.00 | 0.0 |
| 0.001 | 50 | 1000 | 0.05 | 63 | 63 | 0 | 10 | 0.01 | 0.0 |
| 0.001 | 75 | 1000 | 0.08 | 211 | 211 | 0 | 10 | 0.02 | 0.0 |
| 0.001 | 100 | 1000 | 0.10 | 500 | 500 | 1 | 10 | 0.05 | 0.0 |
| 0.001 | 125 | 1000 | 0.13 | 977 | 977 | 1 | 10 | 0.10 | 0.0 |
| 0.001 | 150 | 1000 | 0.15 | 1688 | 1688 | 2 | 10 | 0.17 | 0.0 |
| 0.001 | 175 | 1000 | 0.18 | 2680 | 2680 | 3 | 10 | 0.27 | 0.0 |
| 0.001 | 200 | 1000 | 0.20 | 4000 | 4000 | 4 | 10 | 0.40 | 0.0 |
| 0.001 | 225 | 1000 | 0.23 | 5695 | 5695 | 6 | 10 | 0.57 | 0.0 |
| 0.001 | 250 | 1000 | 0.25 | 7813 | 7813 | 8 | 10 | 0.78 | 0.0 |
| 0.001 | 275 | 1000 | 0.28 | 10398 | 10398 | 10 | 10 | 1.04 | 0.0 |
| 0.001 | 300 | 1000 | 0.30 | 13500 | 13500 | 14 | 10 | 1.35 | 0.0 |
| 0.001 | 325 | 1000 | 0.33 | 17164 | 17164 | 17 | 10 | 1.72 | 0.0 |
| 0.001 | 350 | 1000 | 0.35 | 21438 | 21438 | 21 | 10 | 2.14 | 0.0 |
| 0.001 | 375 | 1000 | 0.38 | 26367 | 26367 | 26 | 10 | 2.64 | 0.0 |
| 0.001 | 400 | 1000 | 0.40 | 32000 | 32000 | 32 | 10 | 3.20 | 0.1 |
| 0.001 | 425 | 1000 | 0.43 | 36363 | 36363 | 35 | 10 | 3.64 | 0.1 |
| 0.001 | 450 | 1000 | 0.45 | 45563 | 45563 | 46 | 10 | 4.58 | 0.1 |
| 0.001 | 475 | 1000 | 0.48 | 53586 | 53586 | 54 | 10 | 5.36 | 0.1 |
| 0.001 | 500 | 1000 | 0.50 | 62500 | 62500 | 63 | 10 | 6.25 | 0.1 |
| 0.001 | 525 | 1000 | 0.53 | 72352 | 72352 | 72 | 10 | 7.24 | 0.1 |
| 0.001 | 550 | 1000 | 0.55 | 85100 | 85100 | 83 | 10 | 8.32 | 0.1 |
| 0.001 | 575 | 1000 | 0.58 | 95055 | 95055 | 95 | 10 | 9.51 | 0.2 |
| 0.001 | 600 | 1000 | 0.60 | 108000 | 108000 | 108 | 10 | 10.80 | 0.2 |
| 0.001 | 625 | 1000 | 0.63 | 122070 | 122070 | 122 | 10 | 12.21 | 0.2 |

METHOD AND SYSTEM FOR CONTROLLING AND RECOVERING SHORT DURATION BRIDGE POWER TO MAXIMIZE BACKUP POWER

CROSS REFERENCE TO RELATED APPLICATIONS

This application claims the benefit of U.S. Provisional Application No. 60/328,996, filed Oct. 12, 2001 and U.S. Provisional Application No. 60/410,412, filed Sep. 13, 2002 the contents of which are incorporated by reference herein in their entirety.

BACKGROUND OF INVENTION

This disclosure relates generally to power systems, and especially relates to the storage and recovery of energy from a renewable power source and electrochemical cells.

Geographically remote areas such as islands or mountainous regions are often not connected to main utility electrical grids due to the cost of installing and maintaining the necessary transmission lines to carry the electricity. Even in remote communities where the transmission lines are in place, it is not uncommon for frequent and extended power outages due to weather related faults. In either case, to prevent economic loss in times of an electrical outage, it is often necessary for these communities or industries in these regions to create local "micro" electrical grids to ensure a reliable and uninterruptible power system. This uninterruptible power system may be either a primary system where there is no connection to the main utility grid, or a backup system that activates when an outage occurs.

Electrical power for the local grids comes from a variety of sources including hydrocarbon based and renewable power sources. Within a particular grid it is not uncommon to have multiple generation sources, such as diesel generators, natural gas generators, photovoltaic arrays, and wind turbines working in combination to meet the needs of the grid.

Electrical demands placed on the local grid will vary during the course of a day, week, or season. Since it is not often practical or possible to turn generation sources on and off, inevitably excess power will be generated. This excess energy is typically converted into another form of energy such as heat for storage in another medium such as water. In cold climates, the heated water can then be used for other purposes such as heating buildings, cooking or maintaining temperature in equipment. As the load requirements of the grid increase, it is difficult or impossible to recapture the converted energy back into electrical energy for use in the electrical grid. Further complicating matters is that renewable power sources do not typically run continuously at full power and will experience extended periods of low to no energy output (e.g. night time or seasonal low wind periods).

Electrochemical cells are energy conversion devices, usually classified as either electrolysis cells or fuel cells commonly employed to address back-up power requirement when a grid fails or when a renewable energy source is unavailable. An electrolysis cell typically generates hydrogen by the electrolytic decomposition of water to produce hydrogen and oxygen gases, whereas in a fuel cell hydrogen typically reacts with oxygen to generate electricity. In a typical fuel cell, hydrogen gas and reactant water are introduced to a hydrogen electrode (anode), while oxygen gas is introduced to an oxygen electrode (cathode). The hydrogen gas for fuel cell operation can originate from a pure hydrogen source, methanol or other hydrogen source. Hydrogen gas electrochemically reacts at the anode to produce hydrogen ions (protons) and electrons, wherein the electrons flow from the anode through an electrically connected external load, and the protons migrate through a membrane to the cathode. At the cathode, the protons and electrons react with the oxygen gas to form resultant water, which additionally includes any reactant water dragged through the membrane to cathode. The electrical potential across the anode and the cathode can be exploited to power an external load.

This same configuration is conventionally employed for electrolysis cells. In a typical anode feed water electrolysis cell, process water is fed into a cell on the side of the oxygen electrode (in an electrolytic cell, the anode) to form oxygen gas, electrons, and protons. The electrolytic reaction is facilitated by the positive terminal of a power source electrically connected to the anode and the negative terminal of the power source connected to a hydrogen electrode (in an electrolytic cell, the cathode). The oxygen gas and a portion of the process water exit the cell, while protons and water migrate across the proton exchange membrane to the cathode where hydrogen gas is formed. The hydrogen gas generated may then be stored for later use by an electrochemical cell.

In certain arrangements, the electrochemical cells can be employed to both convert electricity into hydrogen, and hydrogen back into electricity as needed. Such systems are commonly referred to as regenerative fuel cell systems. Regenerative fuel cells may be used in power generation systems as either primary or secondary power sources. However, because regenerative fuel cell systems generally take a certain amount of time from the point of initial activation to delivering full power, there may be a brief delay of power attendant thereto when switching over from a primary power supply to backup power generated by a fuel cell supply. What is needed in the art is a cost effective apparatus and method for bridging short duration power interruptions.

SUMMARY OF INVENTION

Disclosed herein is a power system, comprising: a primary power source in electrical communication with a bus and a bridging power source, wherein the bridging power source comprises at least one of a capacitor, a battery, and an electrolysis cell, and the bridging power source is in electrical communication with said the; and a secondary power source in electrical communication with the bus, wherein the secondary power source comprises a fuel cell.

Also disclosed herein is a method for operating a power system, comprising: monitoring a primary power source; if the primary power source exhibits selected characteristics, directing power from a bridging power source to a bus and initiating a secondary power source wherein the secondary power source comprises a fuel cell, and the bridging power source comprises at least one of a capacitor, a battery, and an electrolysis cell; and unless the secondary power source exhibits the selected characteristics, powering the bus with the secondary power source and ceasing the directing power from the bridging power source.

Further, disclosed herein is a storage medium encoded with a machine-readable computer program code, said code including instructions for causing a computer to implement the abovementioned method for operating a power system.

Further, disclosed herein is a computer data signal, said computer data signal comprising: instructions for causing a computer to implement the abovementioned method for operating a power system.

Also disclosed herein in an exemplary embodiment is a method for operating a power system, comprising: if a primary power source exhibits first selected characteristics and a secondary power source comprising a fuel cell exhibits second selected characteristics, powering selected loads with an electrolysis cell. The first selected characteristics and the second selected characteristics, individually include at least one of, unavailable inoperable, inadequate to provide power at expected parameters, and unfueled.

The above discussed and other features will be appreciated and understood by those skilled in the art from the following detailed description and drawings.

BRIEF DESCRIPTION OF DRAWINGS

Referring now to the drawings, which are meant to be exemplary and not limiting, and wherein like elements are numbered alike:

FIGS. 11A and 11B are a pair of tables that illustrate the energy storage capacity for a 7,700 µF, and a 1,000 µF capacitor for a variety of different voltage ratings.

DETAILED DESCRIPTION

The following description will provide specific examples with respect to the load and power source voltages for example only. It will also be understood that the method and apparatus for bridging short duration power interruptions may be used with different types of primary/secondary sources and/or other operating voltages, and is not limited to the implementations described herein. Various power sources range from grid power to solar power, hydroelectric power, tidal power, wind power, fuel cell power, and the like, as well as combinations comprising at least one of the foregoing power sources (e.g., via solar panel(s), wind mill(s), dams with turbines, electrochemical cell systems, and the like).

Figure 1:
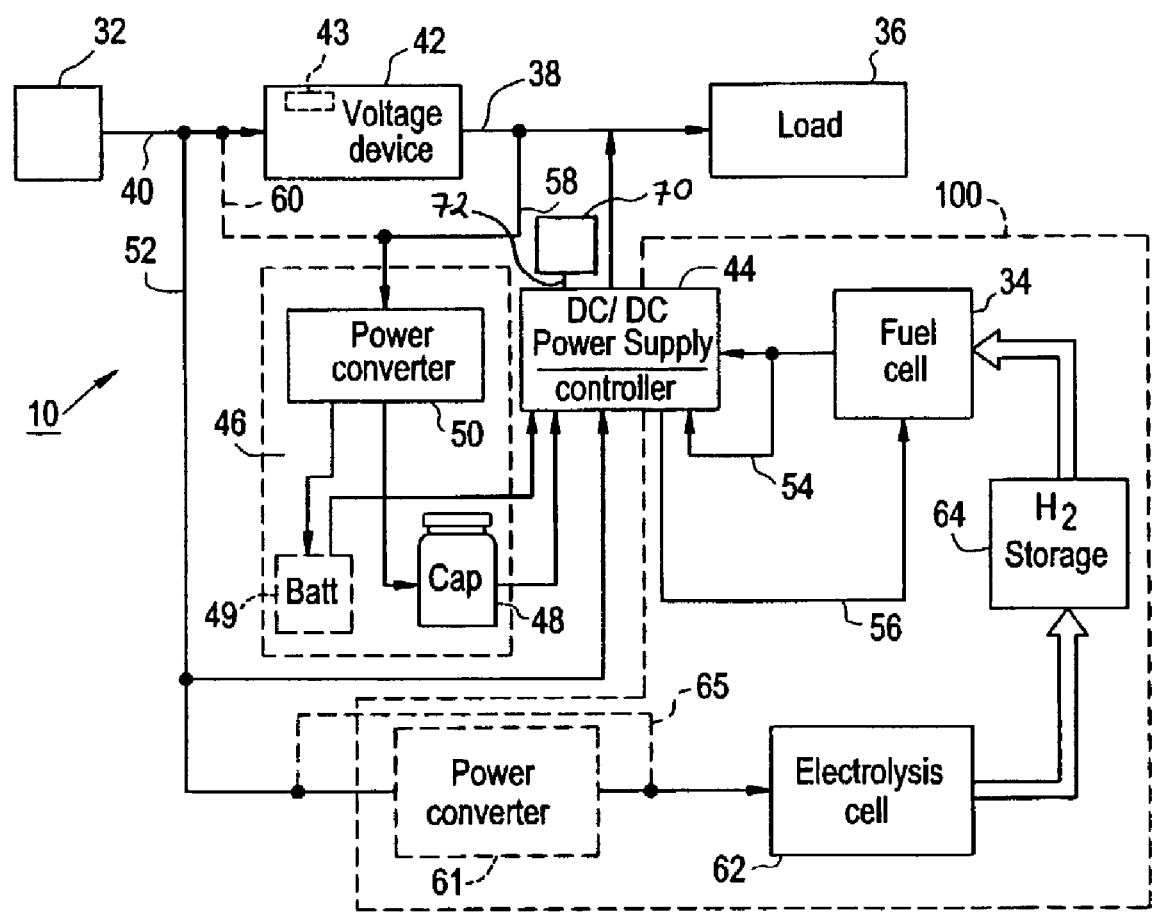
FIG. 1 is a block diagram of a power system featuring a power bridging power source.

FIG. 1 depicts a block diagram of a portion of power system 10 having a primary power source 32 such as generated grid power or that from a renewable source, a secondary power source 100 and a load 36, which load 36 is fed from a feeder bus 38. In the example shown, the primary power source 32 provides power along a primary bus 40; e.g., 120/240 volts alternating current (VAC). It will be appreciated that the actual primary supply voltage is based upon the type of power source including, but not limited to other alternating current (AC) voltage sources, direct current (DC) sources renewable sources such as wind, solar and the like.

Optionally, a conversion device 42 can be employed to rectify the power type (e.g., AC to DC, or DC to AC), or to transform the voltage level (e.g., 48 volts direct current (VDC) to 24 VDC). For example, rectifier 43 can convert 120/240 VAC supply voltage fed from the primary power source 32 to a 24 VDC supply, fed through feeder bus 38 to load 36.

A secondary power source 100 may comprise an electrochemical cell system. The electrochemical cell system may include a fuel cell 34, or a regenerative fuel cell system comprising a fuel cell 34, electrolysis cell 62, an optional power converter 61, optional associated hardware, optional storage devices 64, controls, and the like. The size, i.e., the number of cells, of the fuel cell 34 and optional electrolysis cell 62, and the desired hydrogen production of the electrolysis cell 62 is dependent upon the desired power output of the secondary power source 100 and specifically fuel cell 34. For example, a secondary power source 100 can include a fuel cell 34 that provides about 50 to about 100 VDC output voltage for use by the load 36.

In order to provide backup power for the load 36, a controller/DC—DC power supply 44 may be used to convert the power from the secondary power source 100 to a power receivable by the feeder bus 38. For example, the input from the fuel cell 34 is converted to an output that is connected to feeder bus 38, wherein a smooth output is an uninterrupted power that has an average voltage fluctuation of less than or equal to about 10% over several seconds. An uninterrupted power is a less than or equal to about 0.005 second delay between cease of power supply from primary power source 32 and introduction of power from controller/DC—DC power supply 44.

During operation with a regenerative fuel cell system, the primary power source 32 provides power via optional power converter 61 to an electrolysis cell 62 e.g., an electrolyzer, which generates hydrogen gas. When the optional power converter 61 is not employed, the electrolysis cell 62 may be directly connected to the primary bus 40 via line 65. The hydrogen generated by the electrolysis cell 62 is stored in an appropriate storage device 64 for later use. At such a point in time as required for operation such as outages of the primary power source 32 and the like, or for a renewable power source, during the day or season where the power generation capability of the renewable power source declines (e.g., night time), the primary power source 32 or secondary power source 100 will need to offset the loss in capacity. The hydrogen previously stored in storage device 64 is supplied to a hydrogen electrochemical device, e.g., fuel cell 34, which converts the hydrogen into electricity to supply to the load 36. Power generation will continue until the hydrogen in the storage device 64 is exhausted or the power is no longer required. Reasons for ending power generation may include, for example, the restoration of the grid power, restoration of renewable energy sources (such as solar, wind, wave power, or the like), and/or the determination that peak-shaving is no longer cost effective or no longer required.

Once the amount of hydrogen in the hydrogen storage device 64 decreases below a pre-determined level, the electrolysis cell 62 engages to replenish the hydrogen supply. Preferably, hydrogen will be replenished whenever the hydrogen storage level in the hydrogen storage device 64 is less than full, and there is power available from the primary power source 32 for the electrolysis operation to ensure the longest possible operational duration capability for the secondary power source 100, e.g., the fuel cell 34. Alternatively, hydrogen may be replenished with the addition of hydrogen from another source. For example, another hydrogen generating means, or replacement, replenishment, or supplementation of the existing hydrogen storage device 64.

Returning to FIG. 1 once again, and to discussion of the secondary power source 100, because fuel cell systems generally take a certain amount of time from the point of initial activation to delivering full power, there may be a brief delay of power attendant thereto when switching over a primary power source 32 to secondary power source 100 and power generated by a fuel cell 34. To address this time lapse, a power system may employ a bridging power source 46. The bridging power source 46 stores electrical energy and temporarily provides power to load 36 in the event of any gap or delay between the transfer of power delivery from the primary power source 32 to the power delivery from the secondary power source 100, namely, fuel cell 34. For example, power system 10 may include a monitor of the primary power source 32 (e.g., a grid, solar power, another electrochemical system, and the like); and upon a cease in power from the primary power source 32, start-up an secondary power system 100 and introduce power from the bridging power source 46 during the time lapse. The bridging power source 46 may comprise a capacitor 48 and/or battery 49 and optionally a power converter 50.

Charging of the capacitor 48 and/or battery 49 may be accomplished in various fashions, depending upon the type of primary power source 32 and the voltage of feeder bus 38 or primary bus 40, accordingly. The capacitor 48 or battery 49 can be charged with power from primary bus 40 via optional power converter 50. Power converter 50 converts the voltage from the bus voltage on feeder bus 38 (or primary 40 depending upon the implementation) to the capacitor/battery voltage. Meanwhile, a conversion device 42 can be employed, if desired, to adjust the voltage of primary bus 40 to the desired voltage for the feeder bus 38. Alternatively, the power can pass from primary bus 40 through conversion device 42, to feeder bus 38. Power converter 50 may alternatively convert voltages from feeder bus 38 to charge to the capacitor 48 and/or battery 49. Finally, it will be appreciated, that capacitor 48 and/or battery 49 may be operably connected to either primary bus 40 or feeder bus 38 directly. In this embodiment, power from primary bus 40 can be converted from AC to DC, and/or the DC voltage of the feeder bus 38 may be converted to the desired capacitor voltage via power converter 50. For example, the energy used to charge capacitor 48 or battery 49 can come from the output of rectifier 43 that converts 120 (or 240) VAC on primary bus 40 to 24 VDC on feeder bus 38. The power converter 50 then converts the low voltage (e.g., 24 VDC) input into an appropriate voltage output, which is then used to charge capacitor 48 and/or battery 49.

The output of capacitor 48 and/or battery 49 is connected to controller/DC—DC power supply 44. When capacitor 48 and/or battery 49 is used to bridge the gap in power between a switch-over from primary power source 32 to the secondary power source 100, the controller/DC—DC power supply 44 may be employed to convert the power from the power level of the capacitor 48 to the power level of the feeder bus 38. Preferably, power is supplied by capacitor 48 and/or battery 49 for the period of time from a cease in the power supply from primary power source 32 until commencement of power supply from fuel cell 34 (i.e., when the fuel cell 34 attains operating conditions and begins to supply a predetermined amount of power).

In order to determine when, and for what period, to draw power from capacitor 48, sensing lines 52 and 54 are connected from the primary bus 40 and the output of the secondary power source 100 to the controller/DC—DC power supply 44. In this manner, controller/DC—DC power supply 44 can monitor the status of the primary power source 32 and the secondary power source 100 so that the switching to an appropriate power source may be determined and controlled. It will easily be appreciated that in controller/DC—DC power supply 44, the DC—DC power supply may optionally be separated from the controller.

During a normal mode of operation, the power supplied from primary power source 32 (e.g., 120/240 VAC or optionally a DC source) on primary bus 40 is converted (in the depicted configuration) to a DC voltage by rectifier 43 of conversion device 42. The load 36 draws current from feeder bus 38, regardless of the source of the power thereto. During the normal mode, bridging power source 46 maintains stored electrical energy in the event of a temporary power interruption.

In the event of a loss of power from the primary power source 32, controller/DC—DC power supply 44 senses the loss on the primary bus 40 through sensing line 52. A signal is then sent by controller/DC—DC power supply 44 to the secondary power source 100 (through line 56) to begin generating backup power for feeder bus 38. Because of the inherent time delay of a fuel cell 34 in producing full power, controller/DC—DC power supply 44 converts the output voltage of capacitor 48 and/or battery 49 to voltage that is directed to feeder bus 38 until the secondary power source 100, and more specifically the fuel cell 34 is ready to take over so that load 36 sees an uninterrupted supply of power.

Once controller/DC—DC power supply 44 senses that the fuel cell 34 is generating a desired amount of power, the capacitor 48 and/or battery 49 may be disconnected (circuit broken) from feeder bus 38 and backup power is now directed from the secondary power source 100 and more specifically the fuel cell 34, through controller/DC—DC power supply 44, and onto feeder bus 38. Optionally, at the same time, capacitor 48 and/or battery 49 may be recharged through line 58 from feeder bus 38 and power converter 50. The connecting and disconnecting of the capacitor 48 and/or battery 49 to the DC—DC converter within controller/DC—DC power supply 44 may be accomplished with one or more device(s) such as a power field effect transistor(s) (FET; not shown), transistor(s), thyristor(s), relay(s), switching device(s), and the like, as well as combinations including at least one of the foregoing. Optionally, controller/DC—DC power supply 44 may leave capacitor 48 and/or battery 49 in the circuit but draw essentially no power therefrom. If power from the primary power source 32 is subsequently restored, this will be sensed by controller/DC—DC power supply 44.

This time, however, there is no need to discharge capacitor 48 and/or battery 49, since controller/DC—DC power supply 44 may seamlessly switch from the secondary power source 100 and fuel cell 34 back to primary power source 32 by deactivating the fuel cell 34.

Either during operation of the secondary power source 100 (via feeder bus 38) and/or after reconnection to primary power source 32 (via primary bus 40), the bridging power source 46, namely the capacitor 48 and/or battery 49 may be charged (or recharged, as is appropriate). During charging, current supplied from feeder bus 38 is sent through line 60 to power converter 50, which converts the voltage of feeder bus 38 to that appropriate to charge capacitor 48 and/or battery 49. It should be noted, that once capacitor 48 and/or battery 49 is/are charged, no significant current would be drawn by power converter 50 (if used) from feeder bus 38. Alternatively, it will be further appreciated that in an implementation where primary power source 32 and primary bus 40 comprise a VDC power source, power may be optionally be drawn directly from the primary bus 40 (or optionally through the power converter 50) to charge the capacitor 48 and/or battery 49.

Moreover, the power converter 50 may, be configured as an AC/DC converter (rectifier) coupled directly to the primary power source 32 and primary bus 40. In addition, for yet another alternative embodiment, the output voltage of controller/DC—DC power supply 44 may be generated at a slightly lower value than that resultant from the conversion device 42 (e.g., by about 1 to about 3 volts). In so doing, any current flow from controller/DC—DC power supply 44 onto feeder bus 38 would be limited until such time as the primary power source 32 is unavailable.

Figure 12:
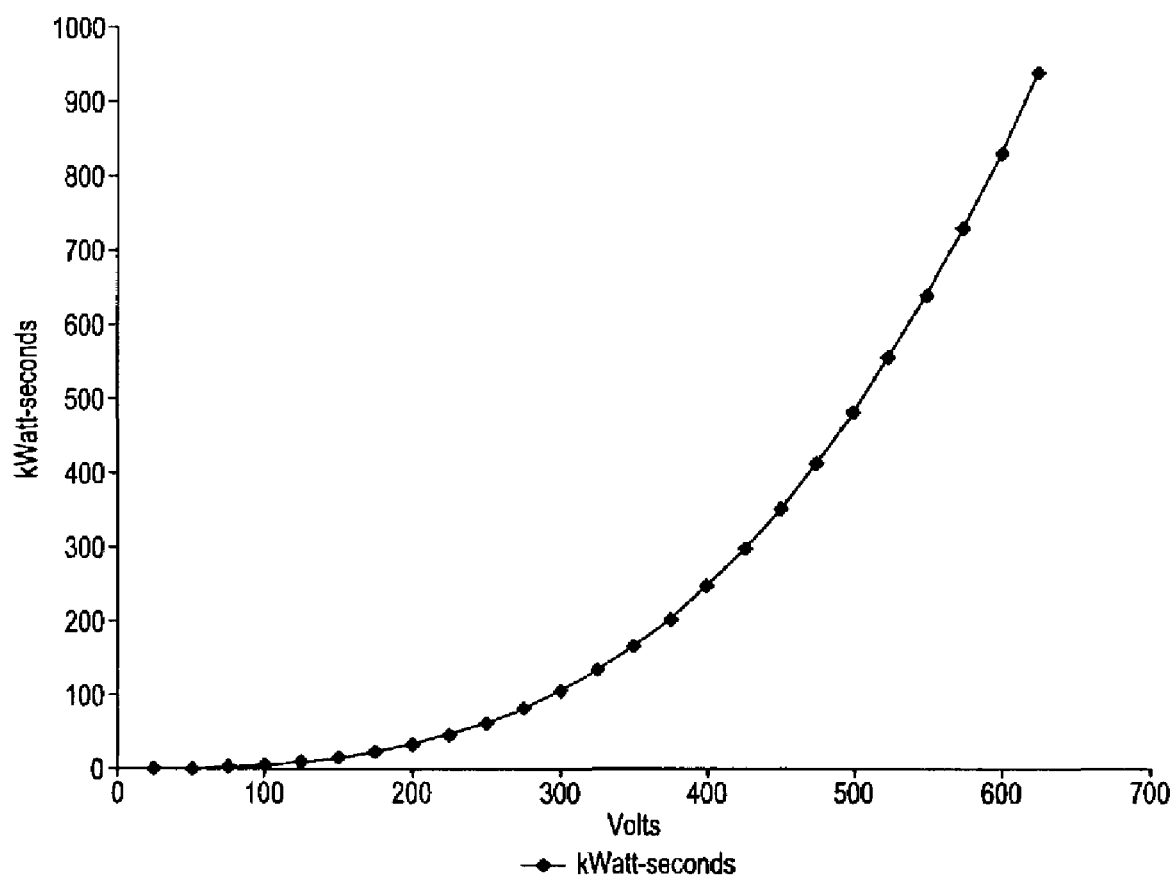
FIG. 12 is a graphical representation of the 7,700 µF capacitor energy storage versus charge voltage.

Referring now to FIGS. 11A and 11B, there is shown a pair of tables, which illustrate the energy storage capacity for a 7,700 μF (microfarad), and a 1,000 μF capacitor for a variety of different voltage ratings. (Also see the graphical representation of FIG. 12). Such a capacitor as depicted in the figure may be employed as capacitor 48 in an exemplary embodiment as described herein. In an exemplary embodiment, the capacitor exhibits a capacitance range of about 1,000 μF (microfarad) to about 7,700 μF at of voltage range of about 450VDC. Naturally, the higher the capacitance and the voltage ratings, the more energy is stored and the more power delivery capability. Likewise, it will be appreciated that various capacitances and voltage ranges may be employed to suit a selected implementation. While a capacitance of about 1,000–7,700 μF at a voltage of about 450VDC has been disclosed, these values are purely illustrative. Many other values are conceivable both larger and smaller and at higher or lower voltages. The voltages for charging the capacitor 48 may be selected as desired for ease of implementation, in an exemplary embodiment, the voltage for capacitor 48 is selected to be about 5 to 10 times the voltage of the feeder bus 38.

The tables of FIGS. 11A and 11B further illustrate the "hold up" or discharge time of the capacitor 48 at a power output of 10 kW. Again, the more energy that is stored, the longer it takes for the capacitor 48 to discharge and hence the longer the bridging power source 46 will be able to bridge power between the primary power source 32 and the secondary power source 100. It should be noted that the actual hold up time of capacitor 48 would be reduced as a function of normal inefficiencies associated with the controller/DC—DC power supply 44 and other system components and interconnections.

Employing a system comprising an electrochemical system in conjunction with a high voltage, medium-sized capacitor as part of a power bridging power source, a cost-effective uninterrupted power supply system is realized. This is especially the case when one or more of the sources have an inherent power-up time associated therewith, such as secondary power source 100 including a fuel cell 34. It should also be noted that the number of components employed may be reduced as disclosed by employing commonality in selected components, e.g., using a common the DC—DC power supply 44 connected to both the capacitor 48 and/or battery 49 and the fuel cell 34 instead of multiple power supplies.

Figure 2:
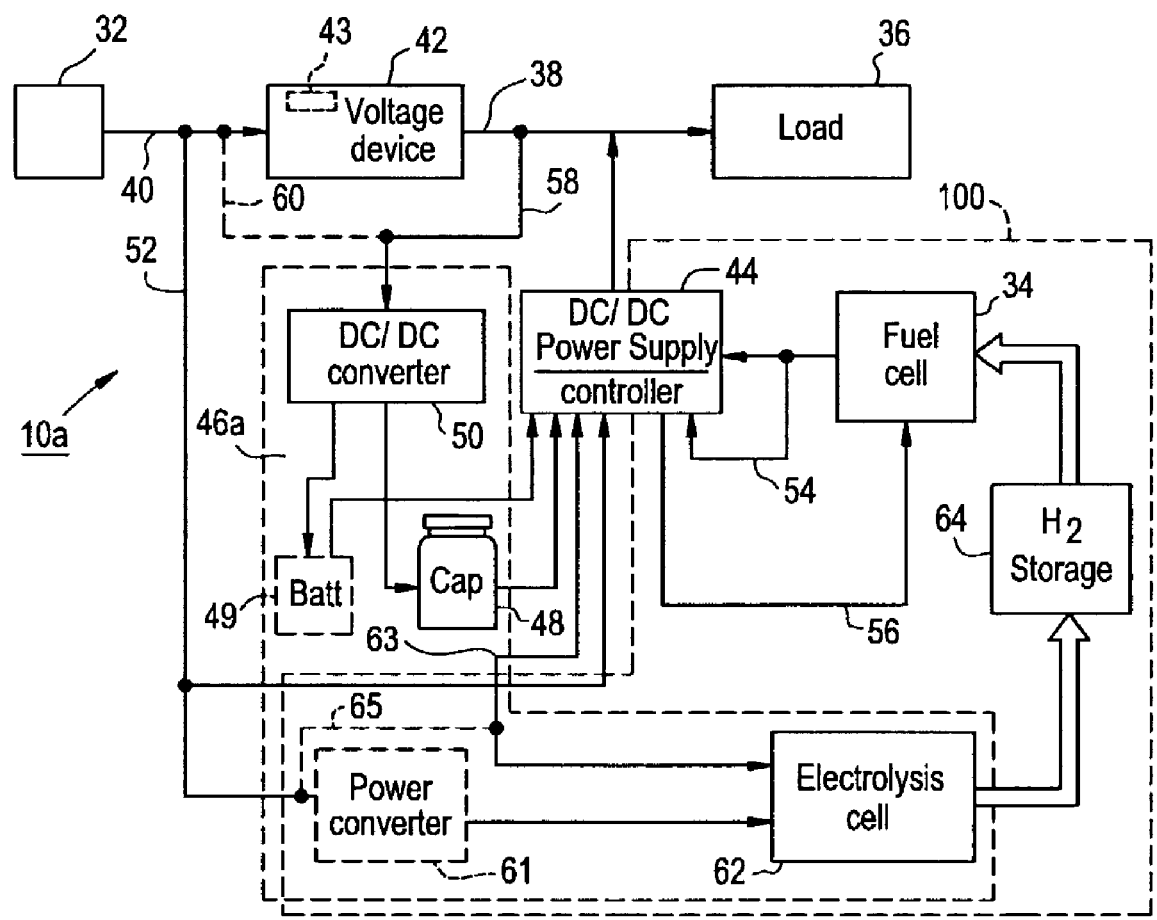
FIG. 2 is a block diagram of a power system featuring a power bridging power source including an electrolysis cell.

Referring now to FIG. 2 there is depicted an alternative embodiment of the power system described above and as depicted in FIG. 1. FIG. 2 depicts a block diagram of a portion of a power system 10a, very similar to power system 10 of FIG. 1, again, having a primary power source 32 such as generated grid power or that from a renewable source, a secondary power source 100 and a load 36, which load 36 is fed from a feeder bus 38.

As described earlier, to provide backup power for the load 36, the controller/DC—DC power supply 44 is used to convert the power from the secondary power source 100 to a power receivable by the feeder bus 38. Likewise, during operation with a regenerative fuel cell system, the primary power source 32 provides power via optional power converter 61 to an electrolysis cell 62, e.g., an electrolyzer, which generates hydrogen gas. The hydrogen generated by the electrolysis cell 62 is stored in an appropriate storage device 64 for later use.

The hydrogen previously stored in storage device 64 is supplied to a hydrogen electrical generator e.g. fuel cell 34, which converts the hydrogen into electricity to supply the load 36. Power generation will continue until the hydrogen in the storage device 64 is exhausted or the power is no longer required.

As previously discussed, due to the inherent delay in start-up of the secondary power source 100 and the fuel cell 34, in addition to the fuel cell 34, a bridging power source 46a may be employed to enable the uninterrupted supply of power to load 36. In this exemplary embodiment, the bridging power source 46a may comprise the electrolysis cell 62 (operating as an electrical source to replace or supplement capacitor 48 and/or battery 49) and optionally a power converter 50 and/or power converter 61.

Continuing with FIG. 2, the electrical input to the electrolysis cell 62 may be disconnected from the primary bus 40 of primary power source 32 and/or the optional power converter 61 and instead connected as an output to supply electrical power as depicted via line 63. During bridging, the electrolysis cell 62 may be employed to generate electricity by utilizing the hydrogen remaining within the electrolysis cell 62 to generate and supply bridging power to feeder bus 38 (via controller/power supply 44). Depending upon the amount of hydrogen available within the electrolysis cell 62, electricity may be supplied for the duration of the above mentioned power interruption between loss of the primary power source 32 and the generation of power from the secondary power source 100, more specifically fuel cell 34. In an exemplary embodiment, an electrolysis cell 62 may supply about 30 watts decaying to about 1 watt of power over about 10 minutes.

In an exemplary embodiment, the electrolysis cell 62 is operably connected to controller/DC—DC power supply 44 in a manner to facilitate the electrolysis cell 62 supplying current to controller/DC—DC power supply 44. When the electrolysis cell 62 is used to bridge the gap in power between a switch-over from primary power source 32 to the secondary source 100, the controller/DC—DC power supply 44 may optionally be employed to convert the voltage from the voltage level output by the electrolysis cell 62 to the voltage level of the feeder bus 38. Preferably, power is supplied by electrolysis cell 62 for the period of time from a cease in the power supply from primary power source 32 until commencement of power supply from the secondary power source 100 (i.e., when the fuel cell 34 attains operating conditions and begins to supply a predetermined amount of power). Otherwise the electrolysis cell 62 may, as described earlier be supplemented with a capacitor 48 and/or battery 49. It will be appreciated, that employing the electrolysis cell 62 in this manner will facilitate elimination of the capacitor 48 and/or battery 49 from the power system 10. Alternatively, the size of the capacitor 48 and/or battery 49 may be reduced because of the net increase in bridge power available with the electrolysis cell 62. Finally, the addition of the electrolysis cell 62 to the bridging power source 46a may result in reduced maintenance and replacement for storage components such as the capacitor 48 and/or battery 49.

During a normal mode of operation, in this embodiment, the power supplied from primary power source 32 (e.g., 120/240 VAC if an AC source) on primary bus 40 is converted (in the depicted configuration) to a DC voltage by rectifier 43 of conversion device 42. The load 36 draws current from feeder bus 38, regardless of the source of the power thereto. During the normal mode, bridging power source 46a maintains stored electrical energy in the event of a temporary power interruption, while the electrolysis cell 62 is operatively configured to receive electrical power and generate hydrogen for storage if needed. Moreover, preferably, the electrolysis cell 62 has fully filled the hydrogen storage device 64 and therefore the electrolysis cell 62 is idle but configured to provide an electrical output to controller/DC—DC power supply 44 and thereby the feeder bus 38. It will be further appreciated that the electrical connection and configuration could be arranged such that the electrolysis cell 62 supplies only a subset of the full load on the feeder bus 38. For example, the load of the feeder bus 38 may be logically partitioned as needed to support various priority loading schemes. Moreover, the load may be further partitioned in consideration of the available backup or bridging power available. For example, the load partition could be modified as backup power storage capability is diminished, providing additional protection for the critical system components and interfaces, such as system controllers, monitors, or watchdog circuits.

As stated above, in the event of a loss of power from the primary power source 32, here again, controller/DC—DC power supply 44 senses the loss on the primary bus 40 through sensing line 52. A signal is then sent by controller/DC—DC power supply 44 to the secondary power source 100 and fuel cell 34 (through line 56) to begin generating backup power for feeder bus 38. Because of the inherent time delay of a fuel cell 34 in producing full power, controller/DC—DC power supply 44 converts the output voltage of electrolysis cell 62 (and/or capacitor 48 and/or battery 49) to voltage that is directed to feeder bus 38 and appropriate partitions thereof, until the secondary power source 100, and more specifically the fuel cell 34 is ready to take over so that load 36 sees an uninterrupted supply of power.

Once controller/DC—DC power supply 44 senses that the fuel cell 34 is generating a desired amount of power, electrolysis cell, 62, and/or the capacitor 48 and/or battery 49 are disconnected and backup power is now directed from the secondary power source 100 and more specifically the fuel cell 34, through controller/DC—DC power supply 44, and onto feeder bus 38. Optionally, at the same time, capacitor 48 and/or battery 49 may be recharged through feeder bus 38 and power converter 50. The connecting and disconnecting of the electrolysis cell 62, and/or capacitor 48, and/or battery 49 to the DC—DC converter within controller/DC—DC power supply 44 may be accomplished with a device such as a power field effect transistor (FET; not shown), or the like. Optionally, controller/DC—DC power supply 44 may leave 48 and/or battery 49 in the circuit but draw essentially no power therefrom. If power from the primary power source 32 is subsequently restored, this will be sensed by controller/DC—DC power supply 44 facilitating a seamless switch from the secondary power source 100 and fuel cell 34 back to primary power source 32 by deactivating the fuel cell 34.

Employing a power system including an electrolysis cell 62 as part of a bridging power source 46a, a cost-effective uninterrupted power supply system is realized. This is especially the case when one or more of the sources have an inherent power-up time associated therewith, such as secondary power source 100 including a fuel cell 34.

Figure 3:
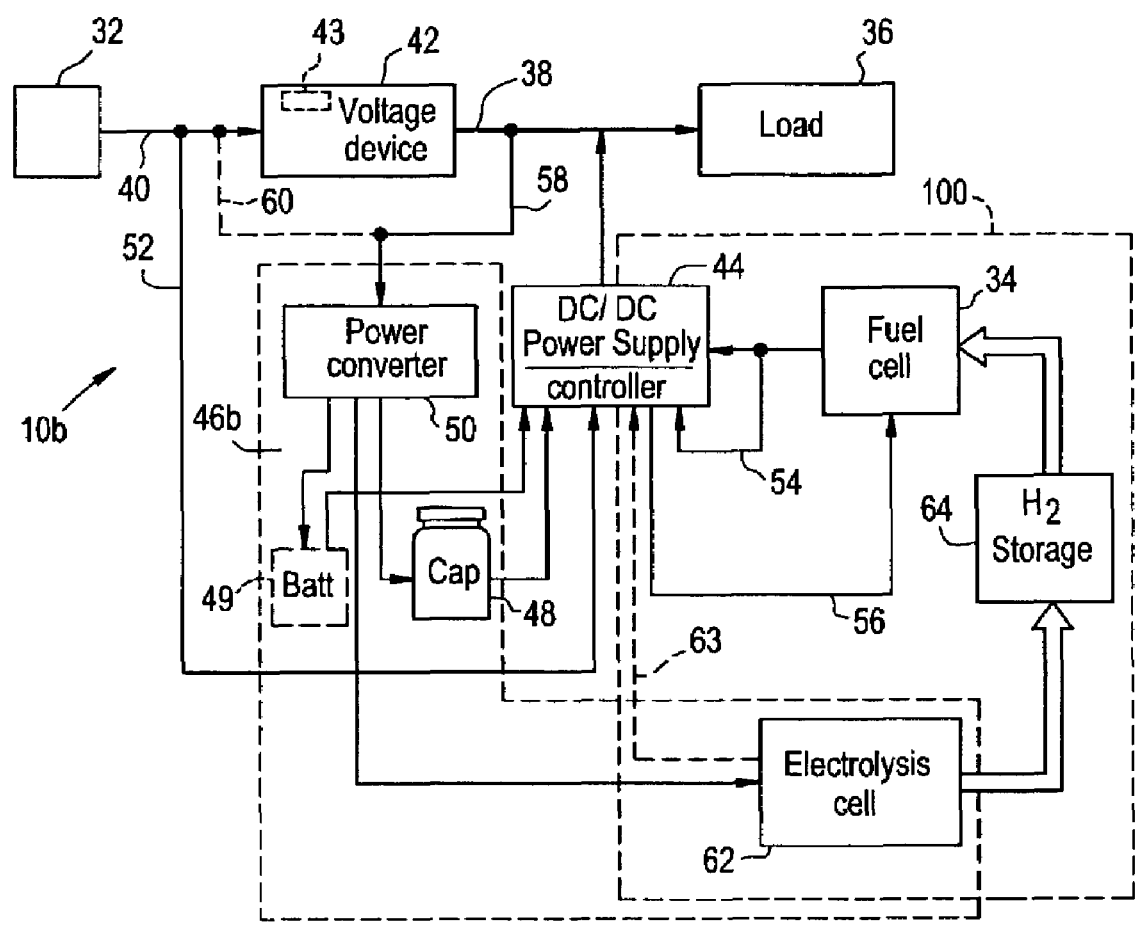
FIG. 3 is a simplified block diagram of a power system featuring a power bridging power source and an electrolysis cell operably connected with a single power converter.

Turning now to FIG. 3, a power system 10b similar once again to the power system 10 and 10a from FIGS. 1 and 2 respectively is depicted to illustrate yet another exemplary embodiment where the electrolysis cell 62 is operably connected to provide power for system control and/or load applications. In this embodiment, as depicted in the figure, it will be appreciated that a bridging power source 46b no longer includes optional power converter 61 and thereby power system 10b is simplified. The electrolysis cell 62 in this instance (as it could also be for the embodiments disclosed above) is configured to be operably connected to optional power converter 50. Once again, it will also be appreciated that while in an exemplary embodiment a DC/DC power converter is disclosed the power converter 50 may be selected to address the configuration of the primary power source 32 whether AC grid power or DC such as from a renewable source, such as wind power generators, photovoltaic and the like as well as a battery bus and so on.

Continuing now with FIG. 3, the electrical input to the electrolysis cell 62 may be disconnected from the primary bus 40 of primary power source 32 (FIG. 2) and/or the optional power converter 50 and instead connected as an output to supply electrical power as depicted via line 63. The electrolysis cell 62 utilizes the remaining internal hydrogen to generate and supply bridging power to feeder bus 38 (via controller/DC—DC power supply 44) for the duration of the above mentioned power interruption between loss of the primary power source 32 and the generation of from the secondary power source 100, more specifically fuel cell 34. Operation of the power system 10b is similar to that described for power systems 10 and 10a for FIGS. 1 and 2 respectively. Only specific differences are address here. It will be appreciated that the FIG. 3 provides a depiction intended to illustrate the operation of power system 10b in the absence of power converter 61.

Figure 4:
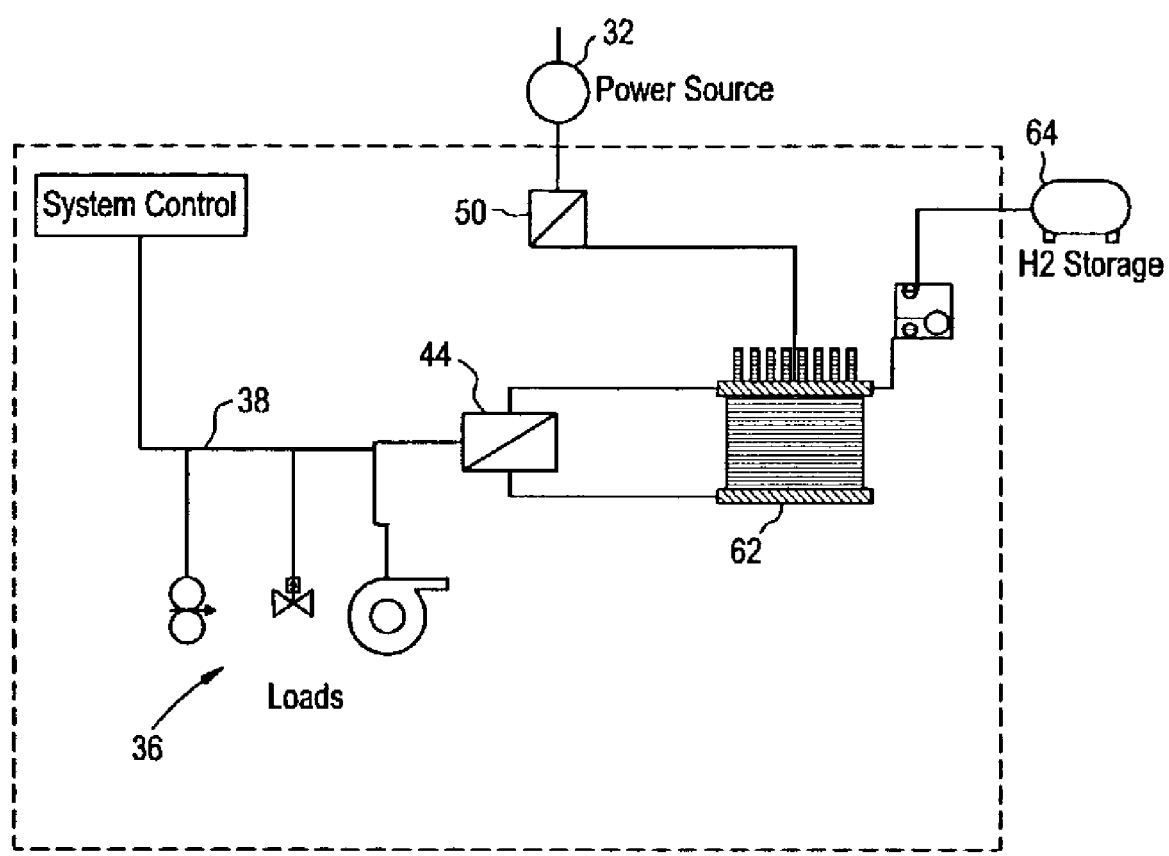
FIG. 4 is a block diagram of a portion of a power system depicting an exemplary embodiment employing an electrolysis cell to maintain system loads.

Turning now to FIG. 4 a portion of the power system 10 from FIGS. 2 and 3 is depicted to illustrate an exemplary embodiment where the electrolysis cell 62 is operably connected to provide power for system control and/or load application. It is note worthy to appreciate that in an embodiment as depicted the electrolysis cell 62 may under certain configurations be utilized entirely to provide bus power in the absence of the primary power source 32.

Figure 5:
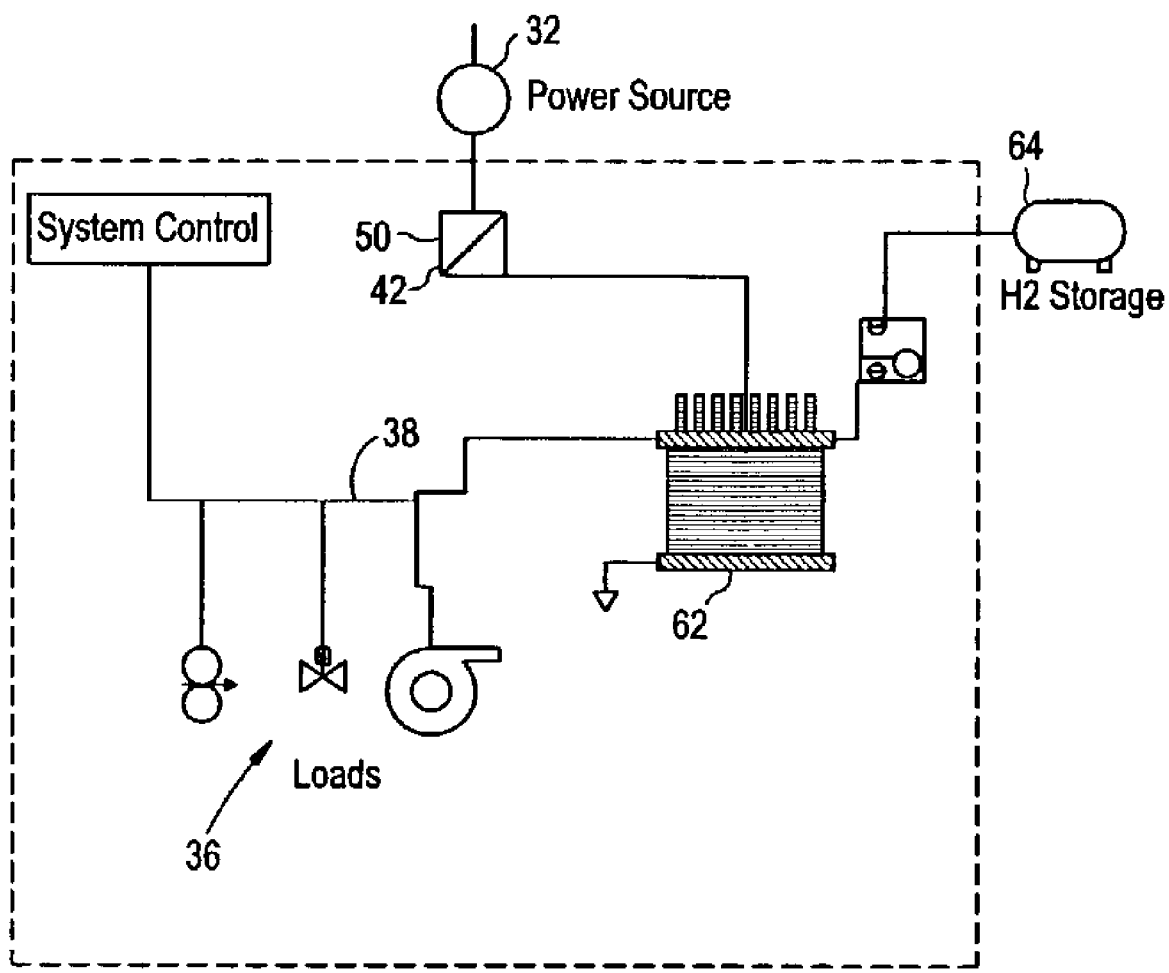
FIG. 5 is a block diagram of a portion of a power system depicting an exemplary embodiment employing an electrolysis cell to maintain system loads, eliminating a power supply.

Turning now to FIG. 5, in yet another exemplary embodiment a portion of the power system 10b from FIG. 3 is depicted to illustrate an exemplary embodiment where the electrolysis cell 62 is operably connected to provide power for system control and load applications. It is note worthy to appreciate that in an embodiment as depicted, the electrolysis cell 62 may be configured and utilized to provide bus power to a load without employing a DC/DC power supply 44 on the output of the electrolysis cell 62 in the absence of the primary power source 32. In such a configuration, the electrolysis cell 62 and/or selected loads may be configured to facilitate operable interconnection between the electrolysis cell 62 and selected loads. For example, the system may be configured to limit the loads applied to the electrolysis cell 62 to the most essential loads (such as system control, monitoring, and diagnostics) and those loads may be configured to operate directly from the voltage output by the electrolysis cell 62. It will be appreciated, that depending upon the power available, loads may be added and deleted as desired.

Figure 6:
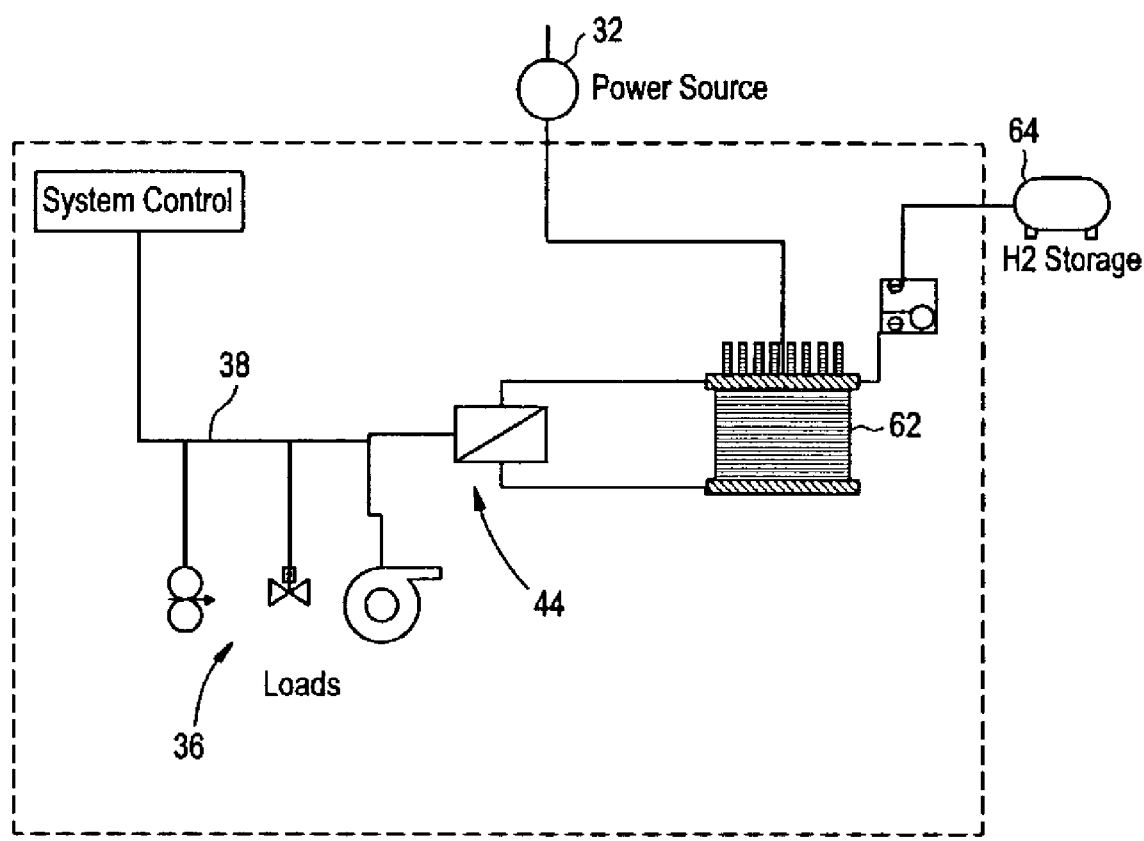
FIG. 6 is a block diagram of a portion of a power system depicting an exemplary embodiment employing an electrolysis cell to maintain system loads, eliminating an input power converter.

Turning now to FIG. 6, in yet another exemplary embodiment a portion of the power system 10 from FIGS. 2 and 3 is depicted to illustrate an exemplary embodiment where the electrolysis cell 62 is operably connected to provide power for system control and load application. In this embodiment as depicted, the electrolysis cell 62 is configured to be interfaced with and may be operably connected to the primary power source 32 without the intervening power converter 50 as described earlier. In such a configuration, once again the electrolysis cell 62 is utilized to provide bus power to the feeder bus 38, and thereby to a load 36 in the absence of the primary power source 32. Once again, in such a configuration, the elimination of the power converter 50 provides for additional system simplification and reduced cost.

Figure 7:
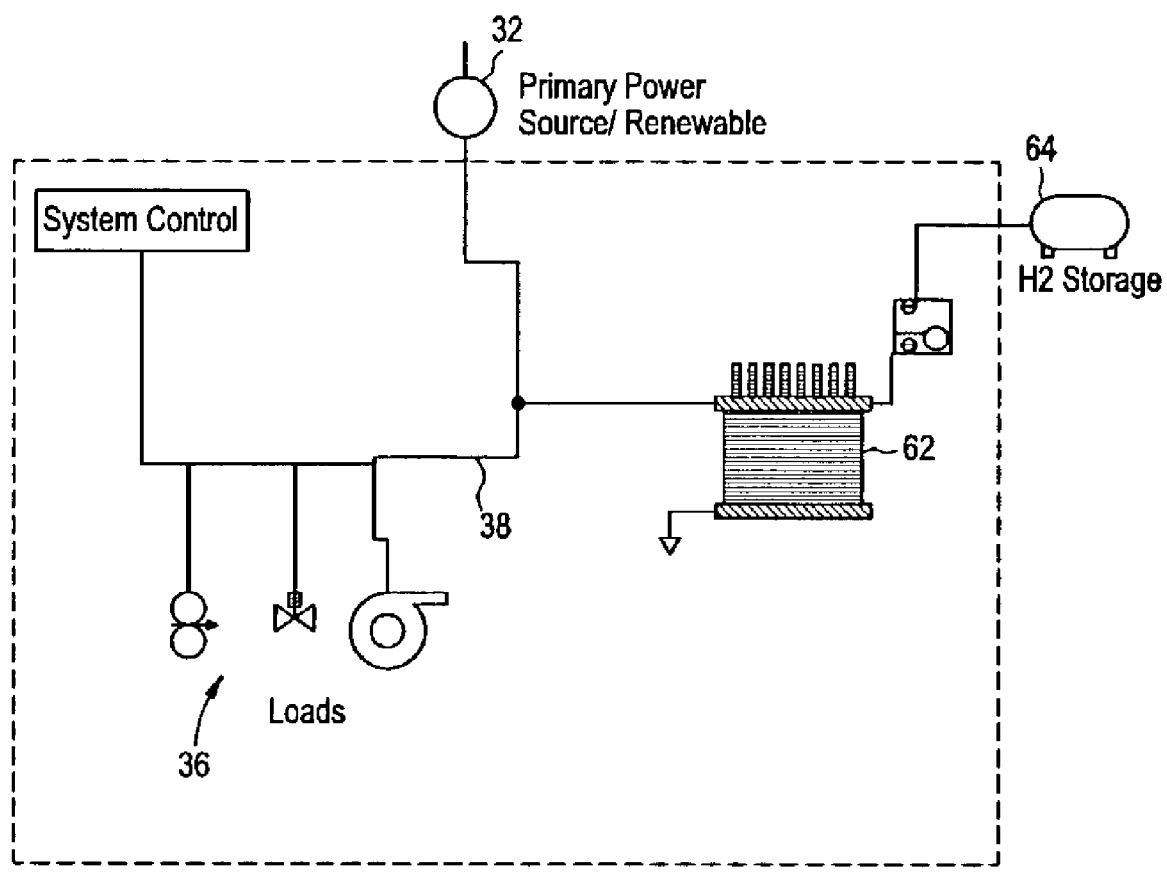
FIG. 7 is a block diagram of a portion of a power system depicting an exemplary embodiment employing an electrolysis cell to maintain system loads, eliminating all power converters.

Optionally, it will be appreciated that the embodiment described above may be further simplified to include the elimination of the controller/DC—DC power supply 44 for conversion of the voltage from the electrolysis cell 62 to the feeder bus 38 and loads 36. Once again, in such a configuration as depicted in FIG. 7, the electrolysis cell 62 may be operably connected to receive power directly from the primary power source 32 e.g. a renewable source with a DC output. Furthermore, the electrolysis cell 62 and/or selected loads may be configured to facilitate operable interconnection between the electrolysis cell 62 and selected loads directly.

Figure 8:
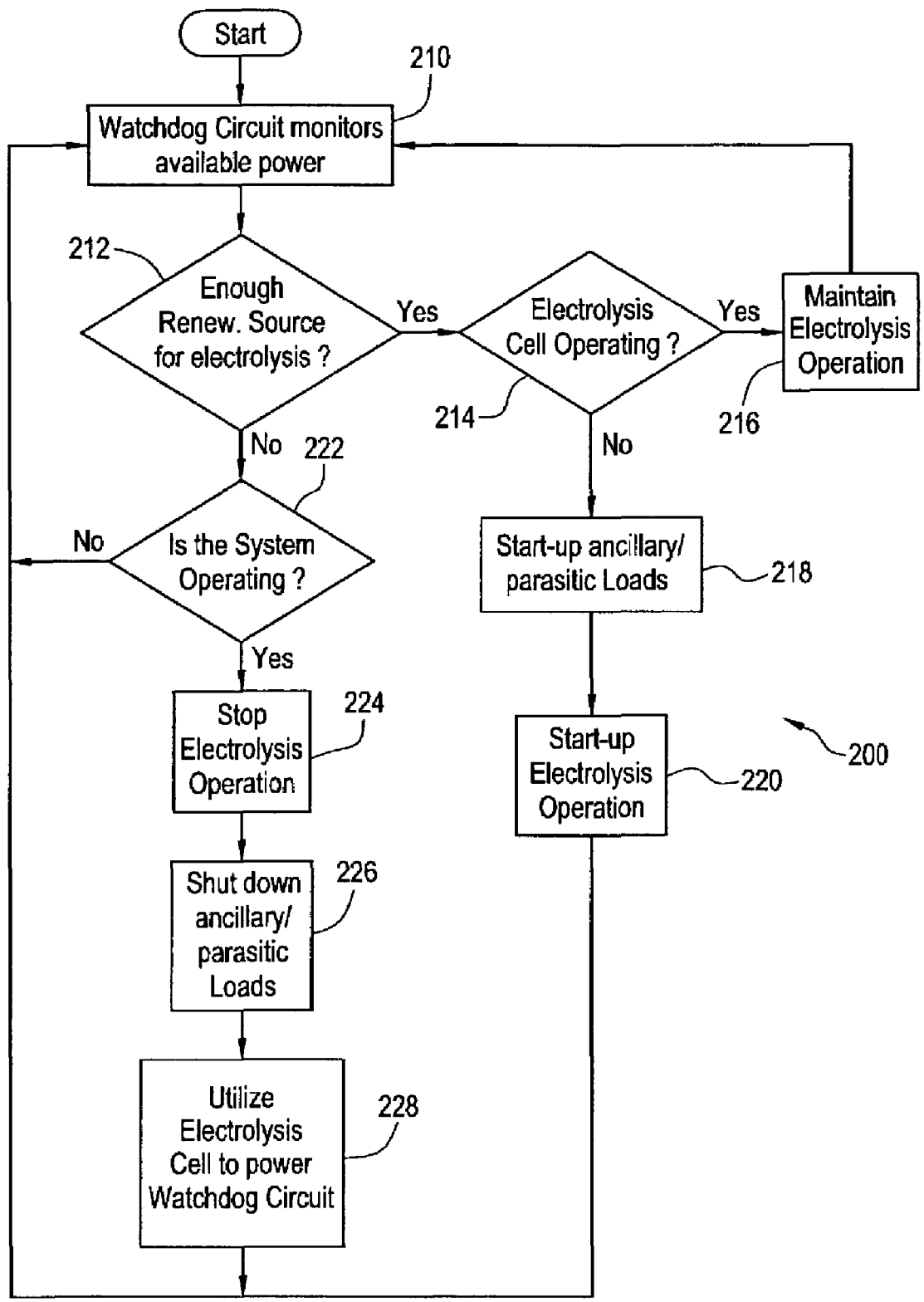
FIG. 8 is a flowchart depicting an exemplary methodology of control of a of an exemplary power system.

Continuing now with FIGS. 1, 2, and 3 and turning as well to FIG. 8, a flow chart depicting an exemplary method of a control process 200 for a power system is depicted. The process 200 initiates with monitoring and evaluation of the power source at block 210. Such monitoring may include evaluation of the voltage on the primary bus 40 (FIGS. 1, 2, and 3), or as depicted in this instance, wind speed or light level for a renewable power source as the primary power source 32. As disclosed earlier, such a renewable power source (FIGS. 1, 2, and 3) includes solar wind, tidal, geothermal resources, and the like as well as combinations including at least one of the foregoing. Decision block 212 includes a determination that the primary power source 32 is adequate for electrolysis. For example, is the input power available from the primary power source greater than or equal to about 500 watts. If so, a determination is made at a second decision block 214 as to whether the electrolysis cell 62 is already operating. If so, a determination is made to continue generation of hydrogen with the electrolysis cell 62 as depicted at block 216 and thereafter the processing returns to block 210. If the electrolysis cell 62 is not operating, yet there is adequate power from the primary power source 32, the selected ancillary/parasitic loads may be started and added as the load. For example as loads added to feeder bus 38. Additionally, the electrolysis cell 62 is powered to generated hydrogen and recharge any depleted hydrogen. The addition of loads is depicted at blocks 218 and 220 respectively. Processing then returns to the initial functions at block 210.

Returning to decision block 212, if there is inadequate power at the primary power source 32, e.g., low light, no wind, grid interruption, and the like, a determination is made at decision block 222 as to whether there is any portion of the system operable, e.g., any power available from any source to operate as opposed to all sources depleted. For example, insufficient power available for electrolysis and yet still electrolyzing. If so, an orderly elimination of loads is initiated at block 224 with the termination of electrolysis, and thereafter shedding of ancillary loads as shown at 226. Finally, block 228 depicts operating the electrolysis cell 62 (denoted E/C) as an electrical power source to power control circuitry and monitoring. Processing thereafter returns to block 210 to repeat the cycle.

Figure 9:
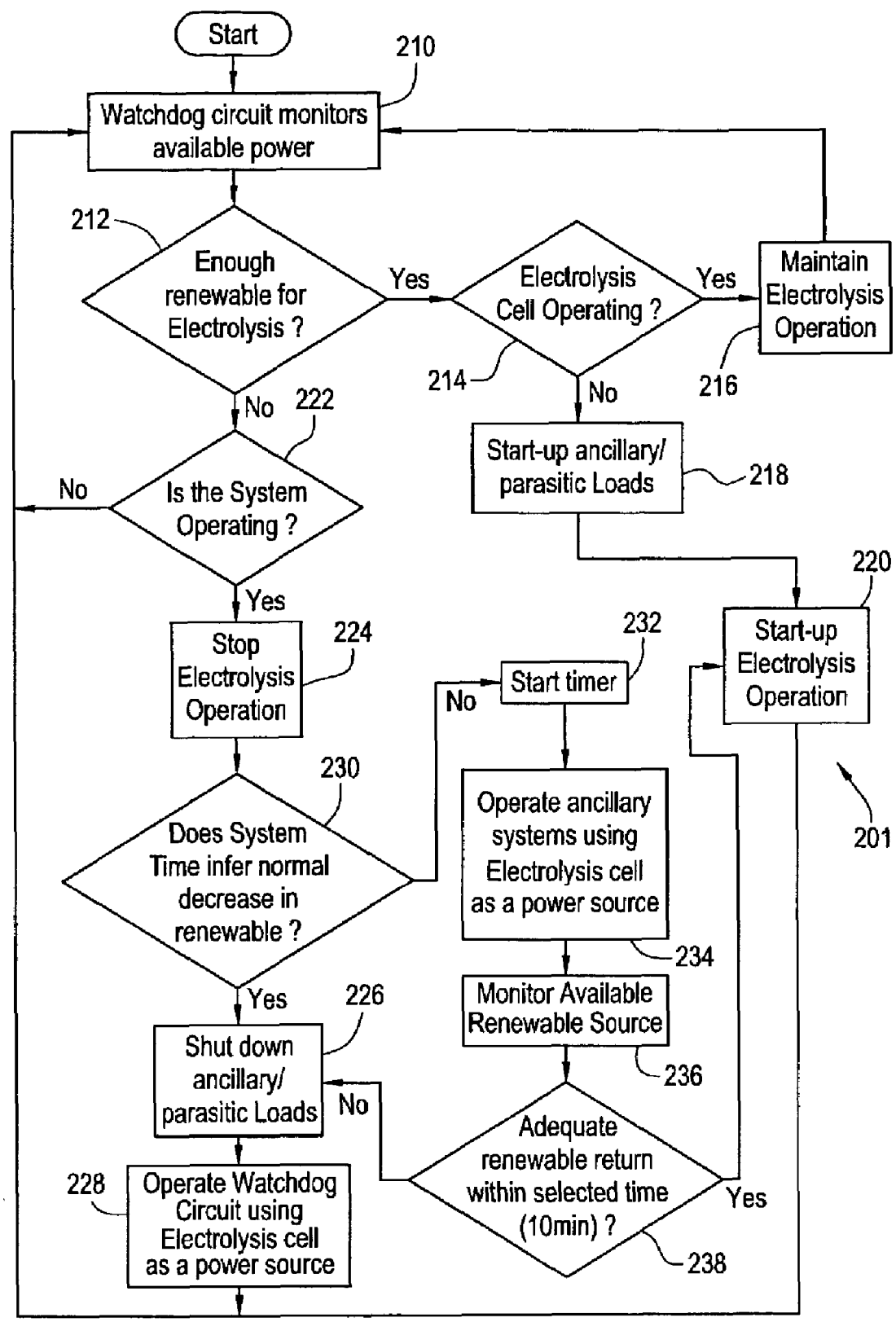
FIG. 9 is a flowchart depicting another exemplary methodology of control of a portion of an exemplary power system.

Continuing now with FIGS. 1, 2, and 3 and turning as well now to FIG. 9, an alternative embodiment is depicted showing exemplary process 201 and control for the power system 10 when experiencing a brief power loss. Such a brief power loss may include but not be limited to, cloud cover for solar systems, wind droop for wind systems, momentary and short grid interruptions, and the like. Processing in this embodiment is similar to that described for process 200 in association with FIG. 8 except that following the block 224 to halt hydrogen generation from the electrolysis cell 62 a decision block, 230 is added to determine if the power interruption is expected or anticipated. For example, in a solar power system, to ascertain if an interruption is due to cloud cover as opposed to sunset. If the interruption satisfies selected criteria for an unexpected interruption, then the process transfers to block 232. Selected criteria may include, but not be limited to a time duration based upon time of day, date, current conditions, weather conditions, geographic position, and the like, as well as combinations including one or more of the foregoing.

Continuing with FIG. 9 at block 232 a timer is initiated to track the duration of the brief loss of the primary power source 32, once again, in this instance a renewable power source. During this time interval, the ancillary system may be powered using the electrolysis cell 62 (denoted E/C) as a source of electricity as depicted at block 234. The status of the primary power source 32 is monitored to determine the availability of the primary power source 32, namely the return to desirable power generation as depicted at block 236. Should the primary power return to acceptable parameters within a selected time-frame, as depicted at decision block 238 the process 201 transfers to block 220 for initiation hydrogen generation with the electrolysis cell 62. If the primary power source is not available within the selected window, the process 201 transfers to block 226 to shut down ancillary loads as described earlier. Similarly, returning to decision block 230, if the interruption of the power source does not satisfy selected criteria for an expected interruption, then the process 201 also transfers to block 226 to shut down as described earlier.

Figure 10:
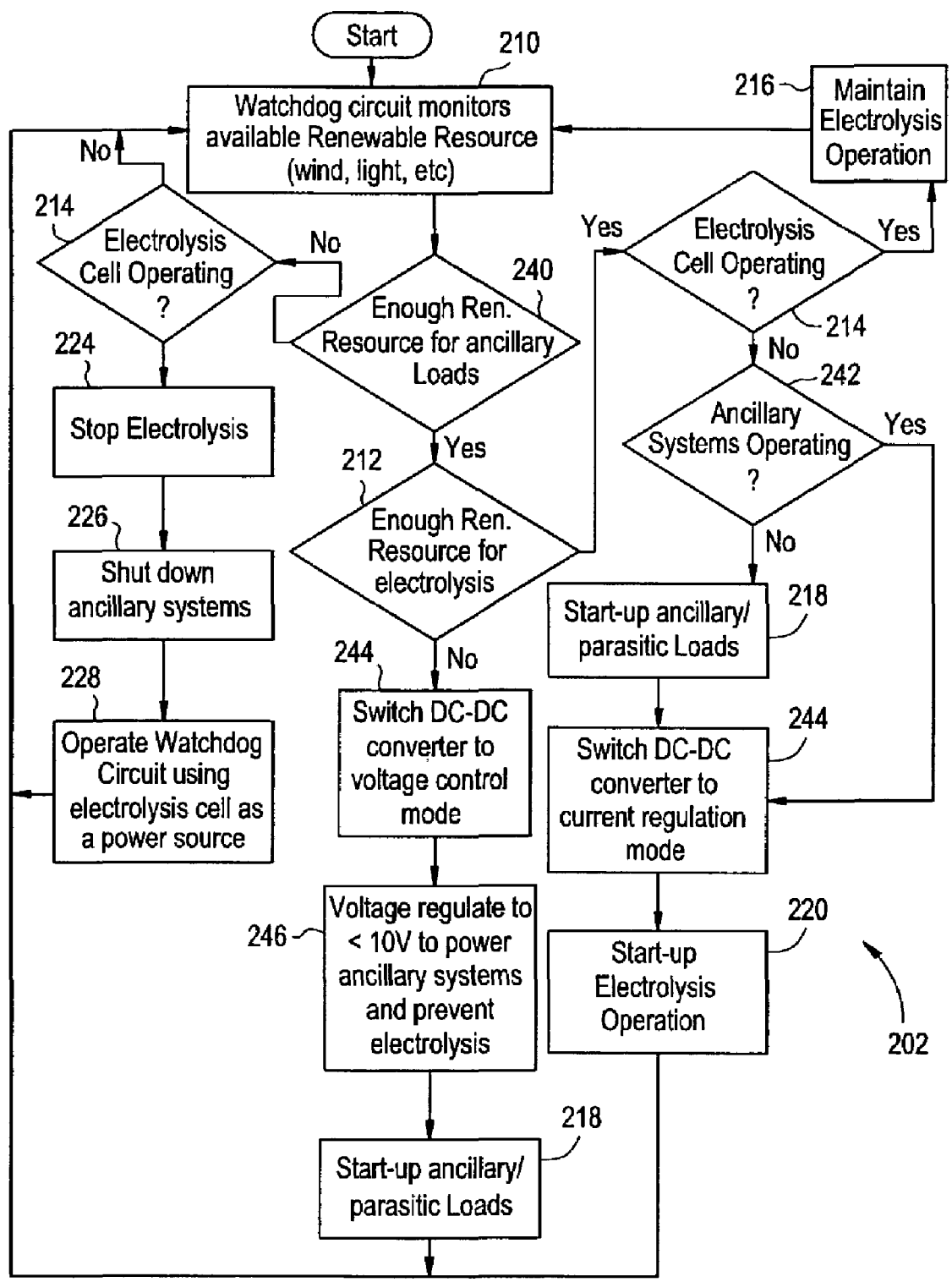
FIG. 10 is a flowchart depicting yet another exemplary methodology of control of a portion of an exemplary power system.

Continuing once again with FIGS. 1, 2, and 3 and turning to FIG. 10, yet another alternative embodiment is depicted showing exemplary control process 202 for the power system 10 employing various configurations of selected power converters e.g., conversion device 42, power converters 50 and 61, and controller/DC—DC power supply 44, to facilitate control of the electrolysis cell 62 as well as the loads applied thereto. More specifically, this embodiment address an optional configuration of the power systems described earlier where the electrolysis cell 62 and loads are connected to a single conversion device 42 (or power converter 50) and the operation of the conversion device 42 as a power converter in light of such a connection. Additionally, in this embodiment, evaluation of the availability of power or a resource is monitored to facilitate determination of the appropriate control action. For example, the process 202 may evaluate the presence of a primary power source 32 such as from a grid, availability of a secondary power source 100, or the status of renewable sources such as wind, light, tidal, geothermal, and the like, as well as combinations including at least one of the foregoing.

Turning to the figure, the process 202 is initiated at block 210 as described earlier, and continues with a decision block 240. Decision block 240 includes a determination that the primary power source 32 (once again, in this instance, a renewable power source, e.g., solar, wind) is adequate for powering selected systems and loads. If not, the process 202 transfers to decision block 214 and thereafter block 224, 226 and 228 as described earlier. Returning to decision block 240, if there is adequate power for other loads the process 202 transfers to decision block 212 where a determination is made as to whether adequate power is available to generate hydrogen with the electrolysis cell 62. If so, similar to previous embodiments, the process 202 transfers to decision block 214, where a determination is made as to whether the electrolysis cell 62 (denoted E/C) is operating. If so, a determination is made to continue generation of hydrogen for the electrolysis cell 62 as depicted at block 216 and thereafter the processing returns to block 210. If the electrolysis cell 62 is not operating, as determined at decision block 214, yet there is adequate power from the primary power source, e.g., 32, the selected ancillary/parasitic loads may be started and added as a load as depicted at decision block 242 and block 218. Moreover, as depicted at block 244, the conversion device 42 may be operated in a current regulation mode to facilitate powering the electrolysis cell 62 and thereby generation of hydrogen to storage in the storage device 64. Process 202 thereafter returns to block 210 to continue.

Returning to decision block 212, if it is determined that there is inadequate power available for electrolysis and hydrogen generation, the process 202 transfers to block 244 where the regulation of the conversion device 42 is set to voltage control mode for controlling selected loads. The process 202 then continues to block 246 were the conversion device 42 regulates and limits the voltage from the primary power source 32 to less than a selected value. Such a configuration facilitates operating various loads without providing sufficient excitation to the electrolysis cell 62 to promote hydrogen generation. In an exemplary embodiment, this voltage would be less than or equal to about 1.4VDC per cell of the cell stack of the electrolysis cell 62. Preferably, less than 1VDC per cell. In an exemplary embodiment employing a 20 cell stack in the electrolysis cell 62, the potential across the cell stack of the electrolysis cell 62 would be less than or equal to 10VDC. The process 202 thereafter continues to block 218 where ancillary load are started and powered. Finally, process 202 returns to block 210 to continue the control cycle.

The disclosed invention can be embodied in the form of computer or controller implemented processes and apparatuses for practicing those processes. The present invention can also be embodied in the form of computer program code containing instructions embodied in tangible media 70, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal 72, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

The invention claimed is:

1. A system for providing back-up power to a load powered by a primary power source, the system comprising:
   a fuel cell arrangement for generating back-up power for the load;
   a bridging power source for generating bridge power for the load, wherein the bridging power source comprises a capacitor; and
   a controller in operable communication with the fuel cell arrangement and the bridging power source, the controller adapted to initiate application of the bridge power to the load upon detecting a deterioration of power from the primary power source, the controller adapted to initiate application of the back-up power to the load upon detecting a power capability of the back-up power to power the load.

2. The system of claim 1 wherein the capacitor has a capacitance of about 1,000 µF to about 7,700 µF.

3. The system of claim 1 wherein the capacitor exhibit a voltage about 5 times to about 10 times a voltage of said bus.

4. The system of claim 1 wherein the capacitor further has a voltage of greater than or equal to about 250 volts.

5. The system of claim 1 further comprising:
   a converter coupled between the primary power source and the load, the converter for converting power from the primary power source to power anticipated by the load.

6. The system of claim 5 wherein the converter comprises a rectifier to convert AC power from the primary power source to DC power for the load.

7. The system of claim 1 wherein the fuel cell arrangement comprises a regenerative fuel cell arrangement.

8. The system of claim 7 wherein the regenerative fuel cell arrangement comprises:
   a fuel cell for generating the back-up power;

a hydrogen storage device in communication with the fuel cell for providing hydrogen thereto; and an electrolysis cell in communication with the hydrogen storage device, the electrolysis cell for generating hydrogen to be stored at the hydrogen storage device.

9. The system of claim 8 wherein the bridging power source comprises the electrolysis cell.

10. The system of claim 8 wherein the electrolysis cell is in communication with the primary power source to power the electrolysis cell.

11. The system of claim 1 wherein the bridging power source comprises a battery.

12. A method for providing back-up power to a load powered by a primary power source, the method comprising:

generating back-up power for the load from a fuel cell arrangement;

generating bridge power for the load from a bridging power source, wherein the bridging power source comprises a capacitor;

initiating application of the bridge power to the load upon detecting a deterioration of power from the primary power source; and initiating application of the back-up power to the load upon detecting a power capability of the back-up power to power the load.

13. The method of claim 12 further comprising:

converting power from the primary power source to power anticipated by the load.

14. The method of claim 13 wherein the converting power comprises converting AC power from the primary power source to DC power for the load.

* * * * *